United States Patent
Kim

(10) Patent No.: US 6,343,353 B1
(45) Date of Patent: Jan. 29, 2002

(54) MICRO-CONTROLLER UNIT FOR ACCESSING EXTERNAL MEMORY USING MICROCODE

(75) Inventor: Hyun Eun Kim, Ichon-shi (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/342,091

(22) Filed: Jun. 29, 1999

(30) Foreign Application Priority Data

Jun. 29, 1998 (KR) .............................. 98-24646

(51) Int. Cl.⁷ .................... G06F 13/00; G06F 12/00
(52) U.S. Cl. ................. 711/167; 711/102; 711/154; 711/170
(58) Field of Search .................... 711/1, 2, 100, 711/102, 154, 170, 167

(56) References Cited

U.S. PATENT DOCUMENTS

| | | | |
|---|---|---|---|
| 5,371,869 A | | 12/1994 | Lee |
| 5,408,639 A | | 4/1995 | Gulick et al. |
| 5,574,926 A | * | 11/1996 | Miyazawa et al. ............. 712/38 |
| 5,860,016 A | * | 1/1999 | Nookala et al. ............. 713/324 |
| 5,860,161 A | * | 1/1999 | Hansen ........................ 711/211 |
| 5,862,148 A | * | 1/1999 | Typaldos et al. ........... 371/22.1 |
| 5,893,923 A | * | 4/1999 | Bush et al. .................. 711/154 |
| 5,896,337 A | * | 4/1999 | Derner ......................... 365/220 |
| 5,903,912 A | * | 5/1999 | Hansen ........................ 711/154 |

FOREIGN PATENT DOCUMENTS

| | | |
|---|---|---|
| JP | 4-142657 | 5/1992 |
| JP | 7-64937 | 3/1995 |

* cited by examiner

*Primary Examiner*—Tuan V. Thai
(74) *Attorney, Agent, or Firm*—Jacobson Holman, PLLC

(57) ABSTRACT

A micro-controller unit for accessing external memory having different access time using a microcode. The micro-controller unit for accessing an external memory according to the characteristics of the external memory includes a first storage device for storing microcodes, a programmable memory for storing cycle extension data of a address latch enable signal and a wait signal and for selectively outputting the cycle extension data as an offset value to a microcode program counter in response to a sequence field from the first storage device and the microcode program counter for increasing a program counter value in response to the offset value from the programmable memory and for outputting an increased program counter value to the first storage device when the offset value is received from the programmable memory.

4 Claims, 6 Drawing Sheets

MICRO-CONTROLLER UNIT FOR ACCESSING EXTERNAL MEMORY USING MICROCODE

FIELD OF THE INVENTION

The present invention relates to a micro-controller unit and, more particularly, to a micro-controller unit for accessing external memory having different access time using a microcode.

DESCRIPTION OF THE PRIOR ART

In general, an embedded application is used to control. Once hardware is decided, a method for controlling it is decided and the method is implemented by programs. Accordingly, such program as well as its size is different according to hardware.

A typical micro-controller unit (hereinafter, referred to as MCU) includes an internal memory such as a code memory for storing microcodes and a data memory for storing data. However, the internal memory of MCU alone may not carry out the large-size embedded application. In that case, an additional external memory may be used to carry out the large-size embedded application.

Accordingly, the MCU includes a memory management unit (hereinafter, referred to as MMU) for controlling read/write operations of the external memory and provides an instruction that enables the MCU to access the external memory.

In addition, the MMU of MCU should have flexibility, that is, ability to accessing the various external memory devices having various characteristics, one of which is the access time.

FIG. 1 is a block diagram illustrating a conventional MCU for accessing the external memory using a handshake method. Referring to FIG. 1, the MCU includes a data path 10, a microcode ROM 12, a MMU 14 and a bus unit 16. In case of accessing the external memory, the MMU 14 outputs an external memory request signal REQUEST to the bus unit 16. The bus unit 16 generates a memory access bus cycle signal BUS CYCLE in repose to the signal REQUEST to access the external memory 18. After accessing the external memory, the bus unit 16 outputs a signal READY to the MMU 14 to inform that it is already ready to send the accessed data and the accessed data are then transmitted to the data path 10.

In the conventional mechanism to be described above, since the access to the external memory is operated through the MMU 14 and the bus unit 16, the operation of accessing the external memory is separated from the internal operation of MCU. Therefore, the MCU may have the high flexibility. However, since the additional hardware such as the MMU and the bus unit is needed and the number of microcodes for internal controls is increased, problems may occur in that the size of the circuit becomes larger.

FIGS. 2 and 3 are timing charts illustrating basic read and write cycles of the external memory, respectively.

Referring to FIGS. 2 and 3, in order to satisfy a various access time of external memory devices having various read/write cycles, an address latch enable signal ALE, a read enable signal RD# and a write enable signal WR# should appropriately be extended according to the specification of the external memory. Where a Port1 is used as an address/data sharing bus and a Port2 is used as an address bus.

Referring to FIG. 4, an operation of the conventional MCU using the handshake method will be described in details. An instruction for accessing the external memory is "MOVX" and the instruction is operated according to a microcode.

In case of the MOVX instruction, a microcode program counter 20 for increasing a program counter value one by one generates a signal ACTIVE to a MMU 14, and then stops increasing the program counter value. When a handshake operation between MMU 14 and the bus unit 16 is completed, the MMU 14 outputs a resuming signal RESUME to the microcode program counter 20. The microcode program counter 20 restarts to increase the program counter value in response to the resuming signal RESUME and sequentially outputs addresses of a next microcode to the microcode ROM 12.

Consequently, the MCU operation is simplified by separately processing a complicated function through the MMU and the bus unit. However, when a small-size MCU is used as the embedded controller processing a simple operation, hardware such as the MMU and the bus unit is needless and the total stability may be degraded.

SUMMARY OF THE INVENTION

It is, therefore, an object of the present invention to provide a micro-controller unit for accessing an external memory using a microcode, thereby scaling down the chip size and improving a stability of the circuit.

In accordance with an aspect of the present invention, there is provided the micro-controller unit for accessing an external memory according to the characteristics of the external memory, comprising: a ROM storing a series of codes including sequence, address latch enable, read enable and write enable fields, wherein the ROM outputs one of codes in response to a counting value and a program counting determining means for determining the counting value in response to the sequence field of the outputted code from the ROM and for outputting the counting value to the ROM.

In accordance with another aspect of the present invention, there is provided a micro-controller unit for accessing an external memory according to the characteristics of the external memory, comprising: a) a first storage means for storing microcodes; b) a programmable memory means for storing cycle extension data of a address latch enalbe signal and a wait signal and for selectively outputting the cycle extension data as an offset value to a microcode program counting means in response to a sequence field from the first storage mean; and c) the microcode program counting means for increasing a program counter value in response to the offset value from the programmable memory means and for outputting an increased program counter value to the first storage means when the offset value is received from the programmable memory means.

BRIEF DESCRIPTION OF THE DRAWINGS

The above and other objects and features of the present invention will become apparent from the following description of the preferred embodiments given in connection with the accompanying drawings, in which.

DETAILED DESCRIPTION OF THE PREFERRED EMBODIMENTS

Hereinafter, the present invention will be described in detail referring to the accompanying drawings.

The present invention provided a MCU capable of accessing an external memory having a different access time using a microcode. The microcode comprises a sequence field, an address latch enable field, a read enable field and a write enable field. Here, the sequence field is used as a select signal of a memory type program block and the address latch enable field is used to extend an address latch enable cycle. The read and write enable fields are used to extend a read and write cycle, respectively.

Figure 1:
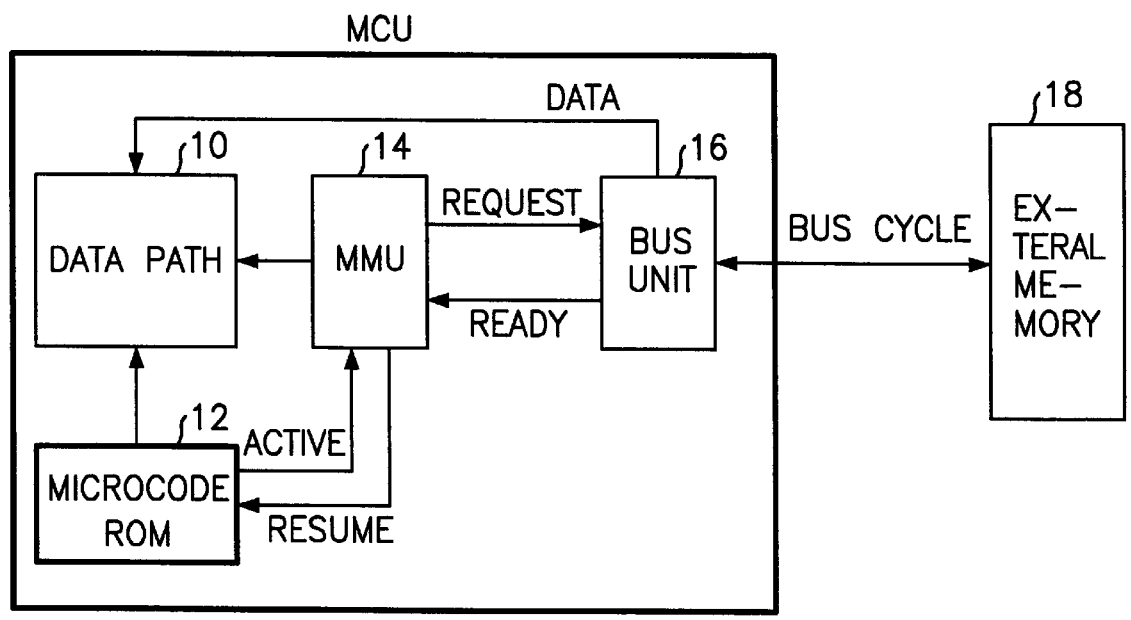
FIG. 1 is a block diagram illustrating a conventional MCU.
Figure 2:
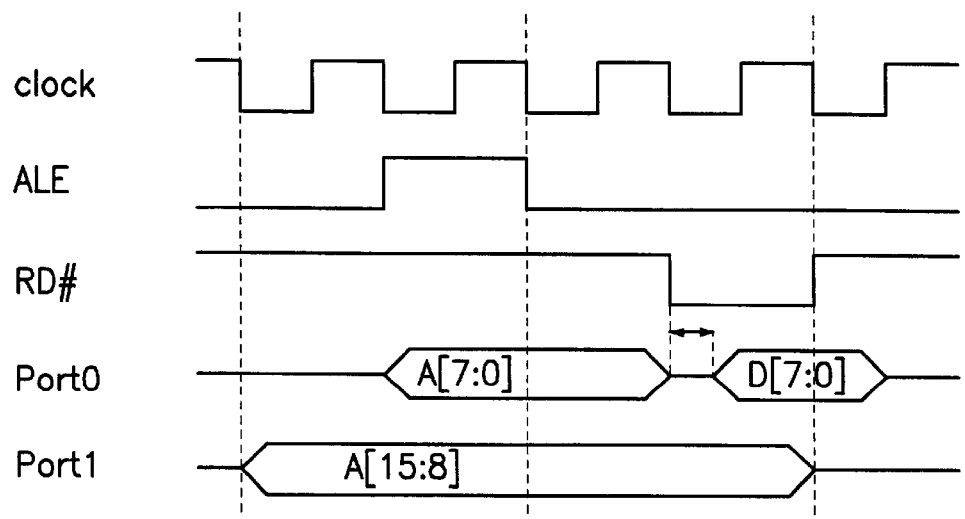
FIGS. 2 and 3 are timing charts illustrating read and write cycles of external memory, respectively.
Figure 3:
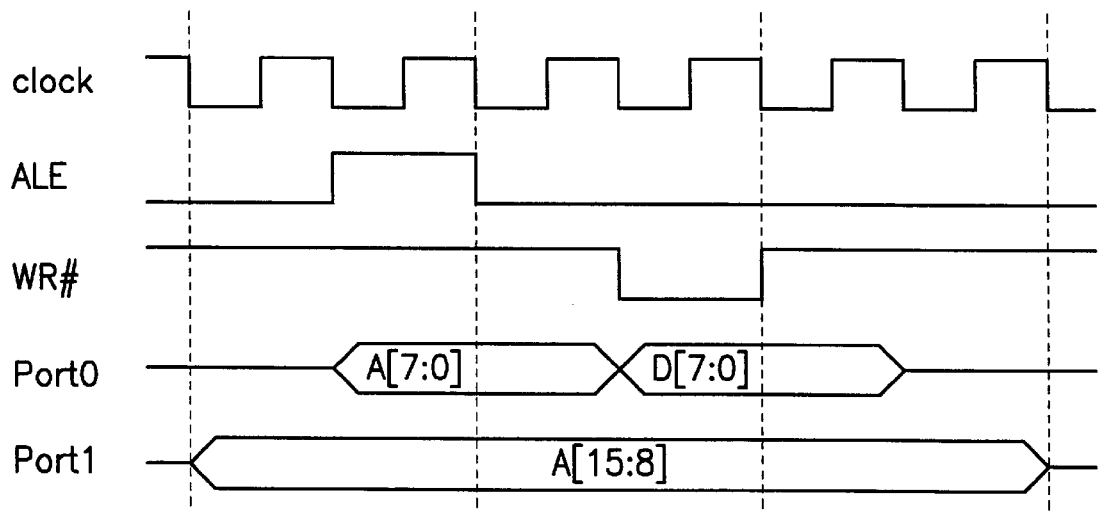
Figure 4:
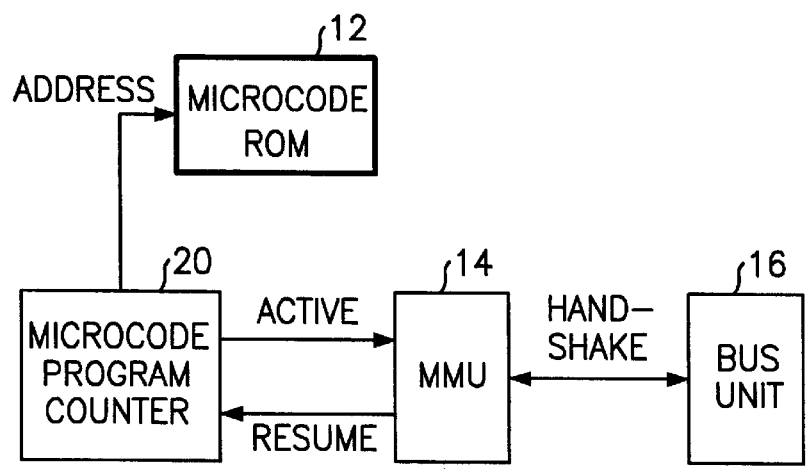
FIG. 4 is a block diagram illustrating a conventional MCU for accessing an external memory using MMU.
Figure 5:
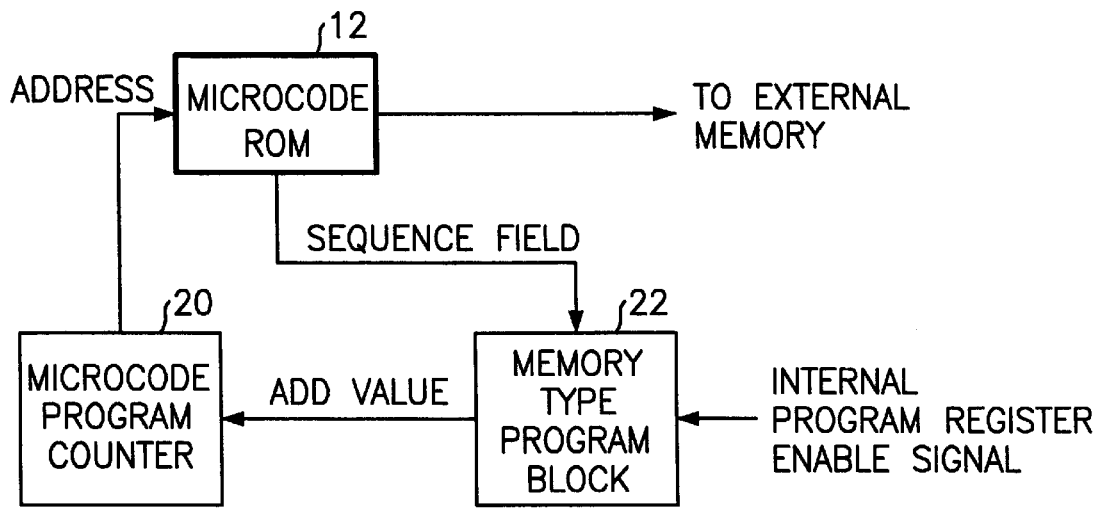
FIG. 5 is a block diagram illustrating a MCU in accordance with the present invention.

FIG. 5 is a block diagram of MCU according to the present invention. Referring to FIG. 5, a memory type program block 22 outputs a value stored in internal registers as an offset value ADD VALUE in response to a sequence field signal SEQUENCE FIELD from a microcode ROM 12. A microcode program counter 20 receives the offset value ADD VALUE and increases the program counter value and then outputs a next microcode address corresponding to the added program counter value. The microcode ROM 12 stores microcodes for accessing the external memory.

The memory type program block 22 stores characteristic values of the external memory in response to internal program register enable signals of ALE program resister enable signal and WAIT program register enable signal, wherein the values are programmed by a user. In addition, the stored values are outputted as an offset value ADD VALUE is response to a sequence field signal SEQUENCE FIELD. Here, the offset value is used to calculate a next program counter value in the microcode program counter 20.

In normal operation, the microcode program counter 20 increases the program counter value one by one. However, in case where the microcode program counter 20 receives the offset value ADD VALUE from the memory type program block 22, the microcode program counter 20 calculates the next microcode program counter value by adding the offset value ADD VALUE to a current program counter value and outputs the next microcode program counter address corresponding to the increased value to the microcode ROM 21.

Figure 6:
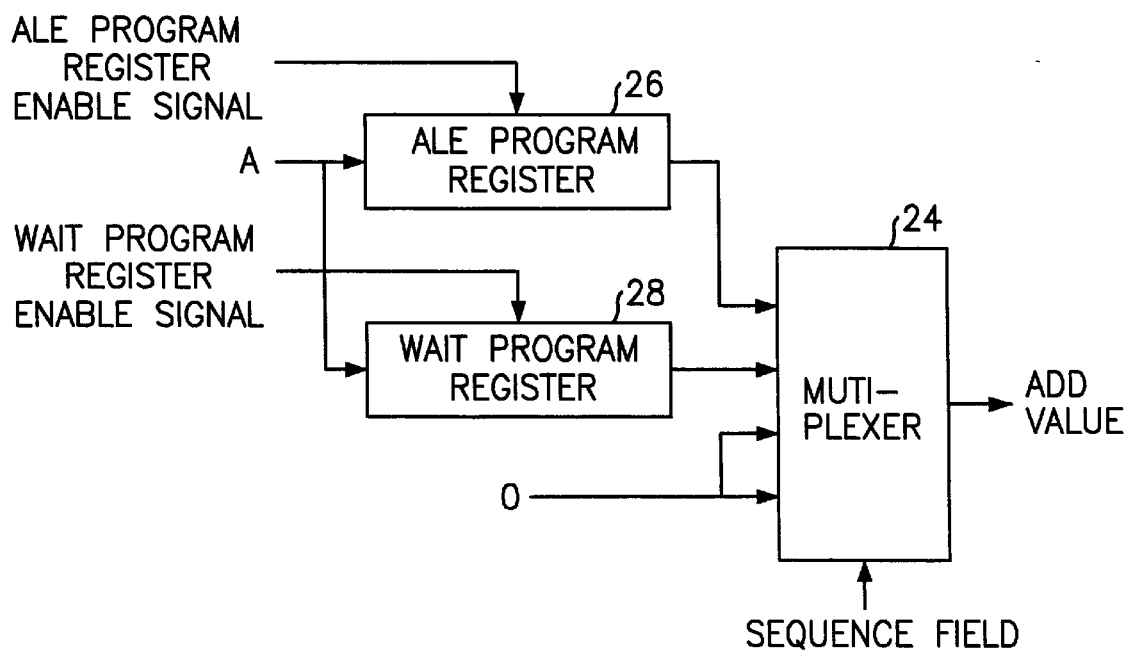
FIG. 6 is a block diagram illustrating a memory type program block in FIG. 5.

FIG. 6 is a block diagram illustrating the memory type program block in FIG. 5. Referring to FIG. 6, an ALE program register 26 stores ALE cycle extension data in response to an ALE program register enable signal, wherein the cycle extension data are programmed according to a characteristic of the external memory by a user. A wait program register 28 stores read or write cycle extension data in response to a WAIT program register enable signal, wherein the cycle extension data are programmed according to a characteristic of the external memory by a user. A multiplexer 24 selectively outputs the data stored in the ALE program register 26 and the WAIT program register 28 and '0' in response to the sequence field signal SEQUENCE FIELD from the microcode ROM 21. Here, the data of the WAIT program register 28 is commonly used to extend the cycle of the read enable signal RD# and the write enable signal WR#.

Figure 7A:
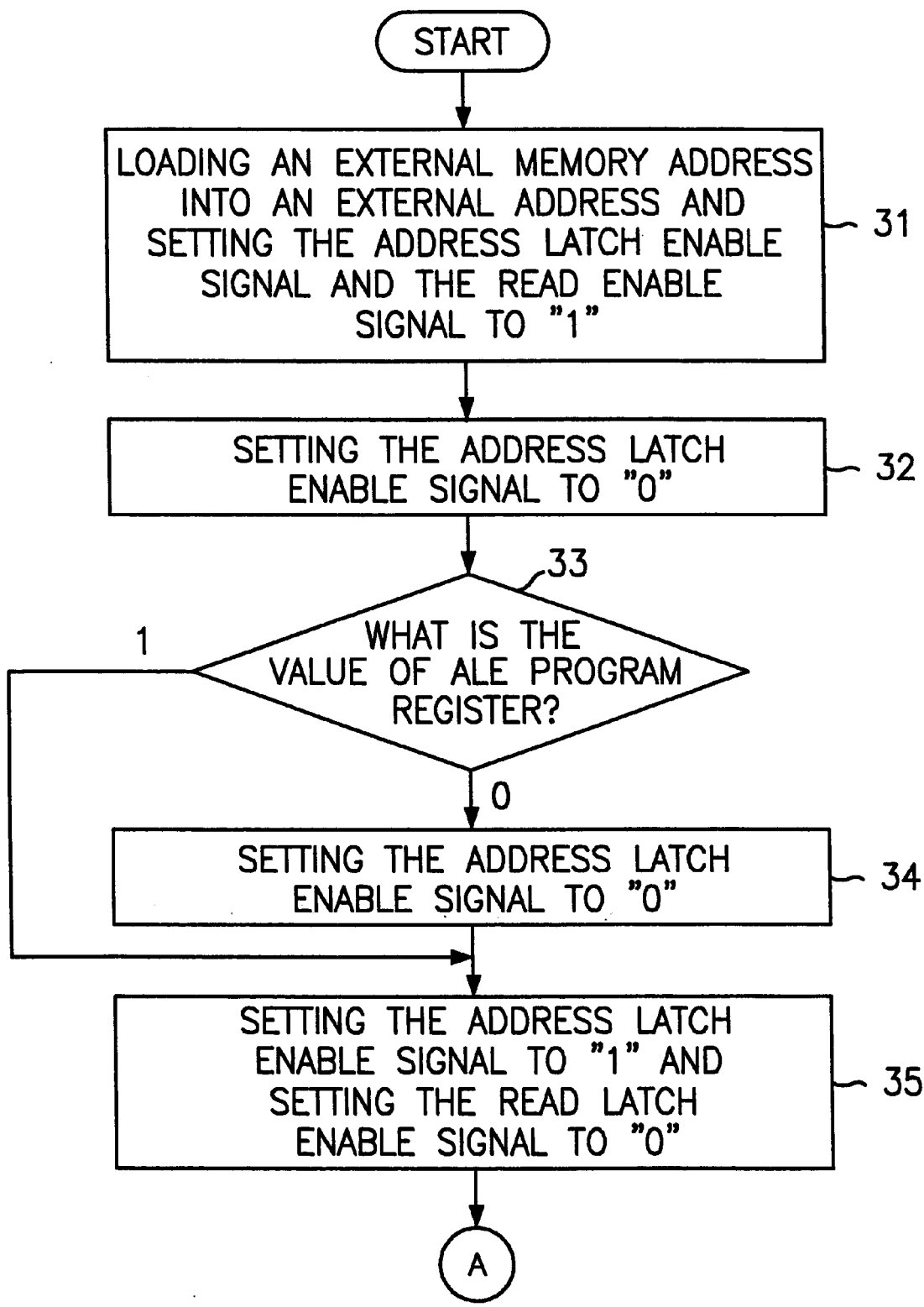
FIGS. 7A and 7B are flow charts illustrating MCU for accessing an external memory.
Figure 7B:
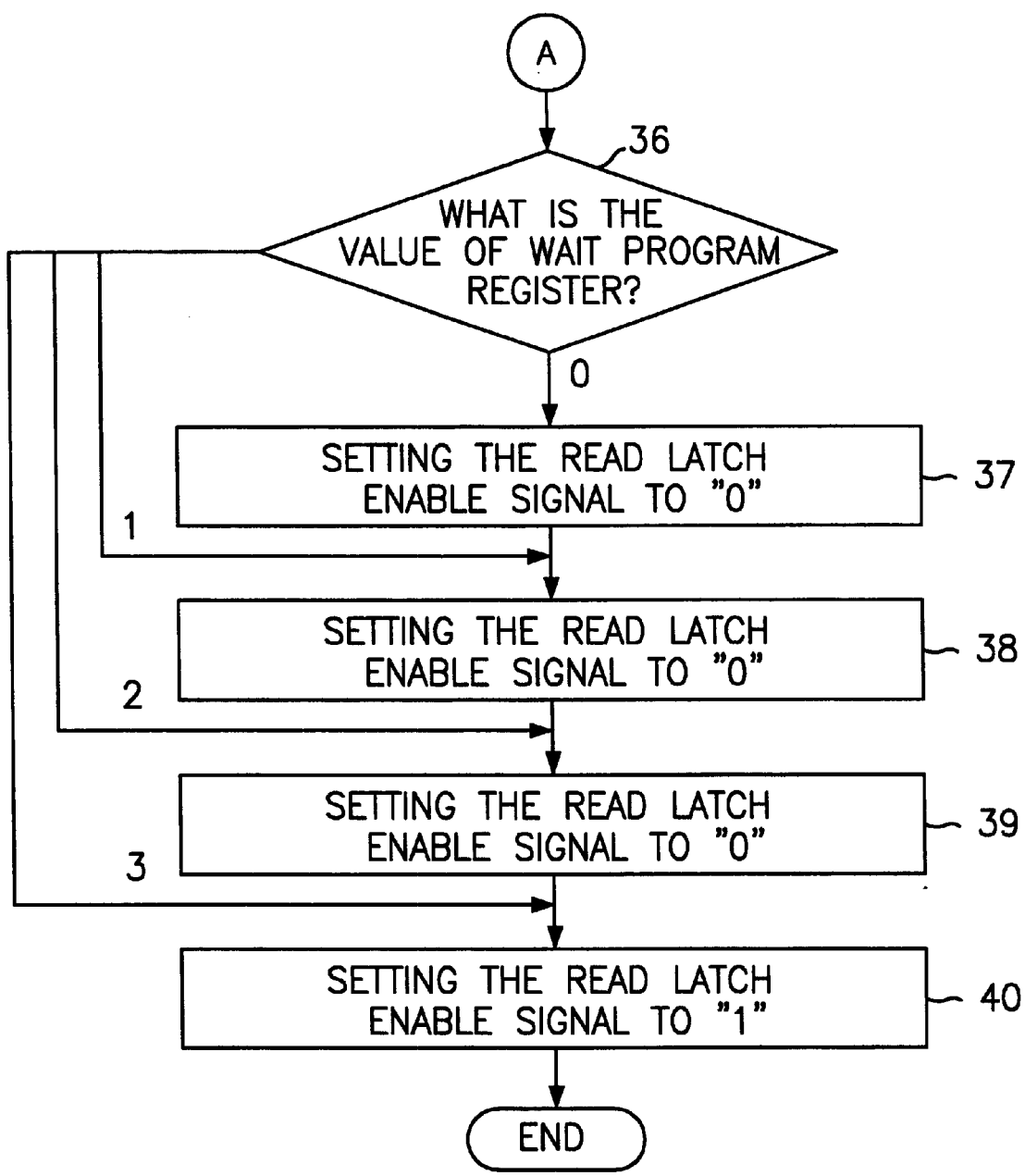
Figure 8:
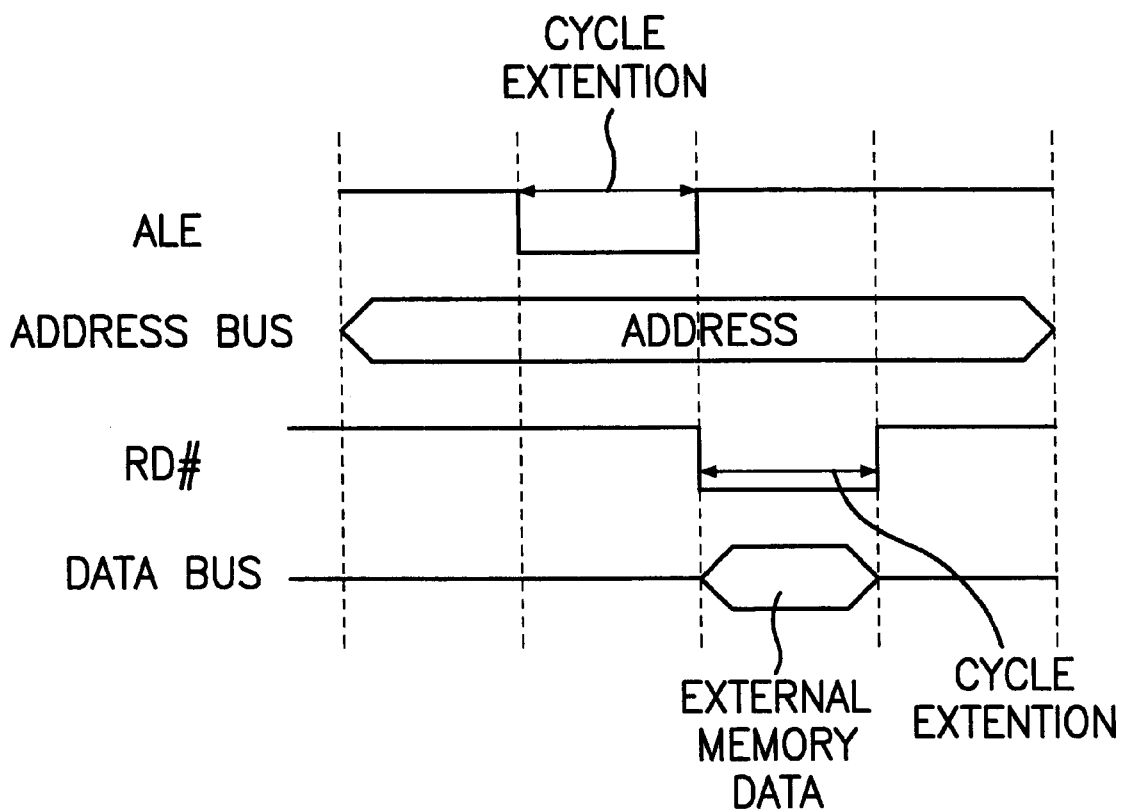
FIG. 8 is a timing chart of an extended memory cycle.

Referring to FIGS. 7A, 7B and 8, an operation of the MCU for accessing the external memory is described in details.

Here, "MOVX reg, address" is an instruction that represents that data corresponding to an external memory address (address) are read out and written to an internal register (reg). It is assumed that an ALE cycle can be extended by one cycle and a WAIT cycle can be extended from one to three cycles.

The microcode ROM 12 comprises microcodes for below-mentioned operations in following order.

Loading an external memory address into an external address bus and setting the address latch enable signal ALE and the read enable signal RD# to "0" (at step 31);

Setting the address latch enable signal ALE to "0" (at step 32);

Setting the address latch enable signale ALE to pb "0" (at step 34);

Setting the address latch enable signal ALE to "1" and setting the read enable signal RD# to "0" (at step 35);

Setting the read enable signal RD# to "0" (at step 37);

Setting the read enable signal RD# to "0" (at step 38);

Setting the read enable signal RD# to "0" (at step 39);

Setting the read enable signal RD# to "1" (at step 40).

First, in executing the MOVX instruction, the microcode program counter 20 outputs an address corresponding to the start address of the instruction and the step 31 is operated so that the address latch enable signal (ALE) and the read enable signal (RD#) are disabled.

Next, with the increase of the program counter by one, the step 32 is operated so that the address latch enable signal ALE is enabled.

Next, a value stored in ALE program register 26 is outputted as an offset value ADD VALUE in response to a sequence field signal SEQUENCE FIELD. At this time, in case where the value of the ALE program register 26 is "0", the offset value ADD VALUE becomes "0". Therefore, the steps 34 and 35 are sequentially operated so that the address latch enable signal ALE is extended by one cycle and the read enable signal RD# is then enabled.

In case where a value of ALE program register 26 is "1", the offset value ADD VALUE becomes "1". Therefore, the program counter value is added to the offset value ADD VALUE and the increased value is outputted. The step 34 is skipped and the step 35 is operated, thus the address latch enable signal ALE is not extended. Simultaneously, the read enable signal RD# is enabled.

Sequentially, a value stored in WAIT program register 27 is outputted as an offset value ADD VALUE in response to a sequence field signal SEQUENCE FIELD.

In case where the value of the WAIT program register 27 is "0", the offset value ADD VALUE becomes "0". Therefore, the microcode program counter is increased one by one. Therefore, the steps 37, 38, 39 and 40 are sequentially operated, so that the read enable signal RD# is set to "0" during three cycles and then is disabled. Consequently, the read enable signal RD# is extended by three cycles.

In case where the value of the WAIT program register 27 is "1", the offset value ADD VALUE becomes "1". Therefore, the microcode program counter is added to the offset value ADD VALUE and an increased value is outputted. Therefore, the microcodes 37 is skipped and the microcodes 38, 39 and 40 are sequentially operated, so that the read enable signal RD# is set to "0" during two cycles and is disabled. Consequently, the read enable signal RD# is extended by two cycles.

In case where the value of the WAIT program register 27 is "2", the offset value ADD VALUE becomes "2". Therefore, the microcode program counter is added to the offset value and an increased value is outputted. Therefore, the microcodes 37 and 38 are skipped and the microcodes 39 and 40 are sequentially operated, so that the read enable signal RD# is set to "0" during one cycles and then is disabled. Consequently, the read enable signal is extended by one cycle.

In case where the value of the WAIT program register 27 is "3", the offset value ADD VALUE becomes "3". Therefore, the microcode program counter is added to the offset value and an increased value is outputted. Therefore, the microcodes 37, 38 and 39 are skipped and the microcode 40 is operated, so that the read enable signal RD# is not extended.

Here, when the value of the ALE program register 26 is '1', the address latch enable signal ALE is not extended. Therefore, the basic value of the ALE program register 26 should be "1". In the similar manner, when the value of the WAIT program register 27 is '3', the read enable signal RD# is not extended. Therefore, the basic value of the WAIT program register 27 should be "1". At this time, the programmed values in the ALE program register 26 and the WAIT program register 27 is not consistent with the extending values. If an inverter is inserted at the output terminal of the ALE and WAIT program register 26 and 27, respectively, the programmed values are consistent with the extending values.

Although the read cycle extension is described, the write cycle extension is also preferably embodied.

While the present invention has been described with respect to certain preferred embodiments only, other modifications and variation may be made without departing from the spirit and scope of the present invention as set forth in the following claims.

What is claimed is:

1. A micro-controller unit for accessing an external memory according to the characteristics of the external memory, comprising:

a) a first storage means for storing microcodes;

b) a programmable memory means for storing cycle extension data of an address latch enable signal and a wait signal and for selectively outputting the cycle extension data as an offset value to a microcode program counting means in response to a sequence field from the first storage means; and c) the microcode program counting means for increasing a program counter value in response to the offset value from the programmable memory means and for outputting an increased program counter value to the first storage means when the offset value is received from the programmable memory means;

wherein the programmable memory means includes;

b-1) a second storage means for storing the cycle extension data of the address latch enable signal, which is programmed by a user, in response to a first enable signal;

b-2) a third storage means for storing the cycle extension data of the wait signal, which is programmed by a user, in response to a second enable signal; and b-3) a selecting means for selectively outputting the cycle extension data of the address latch enable signal and the wait signal which are respectively stored in the second and third storage means as the offset value of the microcode program counting means in response to the sequence field of a corresponding microcode stored in the first storage means.

2. The micro-controller unit as recited in claim 1, wherein the first storage means comprises a first code for enabling the address latch enable signal and a plurality of second codes for keeping the address latch enable signal in an enabled state during a plurality of cycles, and wherein the microcode program counting means outputs the increased program counter value to one of the second codes to keep the enabled state of the address latch enable signal by using the cycle extension data of the address latch enable signal as the offset value.

3. The micro-controller unit as recited in claim 1, wherein the first storage means comprises a third code for enabling a read or write enable signal in order to read or write data which are stored in the external memory and a plurality of fourth codes for keeping the read or write enable signal in an enabled state during a plurality of cycles, and wherein the microcode program counting means outputs an increased program counting value corresponding to one of the fourth codes to keep the enabled state of the wait signal by using the cycle extension data of the wait signal as the offset value.

4. The micro-controller unit as recited in claim 1, wherein the first storage means includes the first code for enabling the address latch enable signal, the plurality of second codes for keeping the enabled state of the address latch enable signal during a plurality of cycles, the third code for disabling the address latch enable signal and enabling the read or write enable signal and the plurality of fourth codes for keeping the enabled state of the read or write enable signal during a plurality of cycles, and wherein the microcode program counting means outputs an increased program counter corresponding to one of the second codes to keep the enabled state of the address latch enable signal and an increased program counter corresponding to one of fourth codes to keep the enabled state of the wait signal by using the cycle extension data of the address latch enable signal and the wait signal, respectively, as the offset value.

* * * * *